(12) United States Patent
Kosaka et al.

(10) Patent No.: US 8,615,884 B2
(45) Date of Patent: Dec. 31, 2013

(54) METHOD OF MANUFACTURING ROLLING BEARING DEVICE

(75) Inventors: Takayuki Kosaka, Chiba (JP); Kenji Suzuki, Chiba (JP)

(73) Assignee: Seiko Instruments Inc. (JP)

( * ) Notice: Subject to any disclaimer, the term of this patent is extended or adjusted under 35 U.S.C. 154(b) by 459 days.

(21) Appl. No.: 12/924,261

(22) Filed: Sep. 23, 2010

(65) Prior Publication Data

US 2011/0072666 A1   Mar. 31, 2011

(30) Foreign Application Priority Data

Sep. 25, 2009   (JP) .................................. 2009-221237
Jun. 4, 2010    (JP) .................................. 2010-129031

(51) Int. Cl.
   *F16C 19/08*   (2006.01)

(52) U.S. Cl.
   USPC ............... 29/898.04; 29/898.06; 29/898.062; 29/898.063; 29/898.066; 29/898.07; 384/512; 384/513; 384/490

(58) Field of Classification Search
   USPC ......... 29/458, 527.1, 527.2, 898.06, 898.062, 29/898.063, 898.066, 898.07, 898.12, 29/898.04; 384/490, 512, 513
   See application file for complete search history.

(56) References Cited

U.S. PATENT DOCUMENTS

| | | | | |
|---|---|---|---|---|
| 5,547,291 A | * | 8/1996 | Miyazaki et al. | 384/512 |
| 5,882,122 A | * | 3/1999 | Noguchi et al. | 384/490 |
| 7,136,262 B2 | * | 11/2006 | Koyama | 360/265.2 |
| 8,096,043 B2 | * | 1/2012 | Hargraves et al. | 29/596 |
| 2010/0135604 A1 | * | 6/2010 | Ozaki et al. | 384/448 |

OTHER PUBLICATIONS

Patent Abstracts of Japan, publication No. 11-182543, publication date Jul. 6, 1999.
Patent Abstracts of Japan, publication No. 2000-346085, publication date Dec. 12, 2000.

* cited by examiner

*Primary Examiner* — Minh Trinh
(74) *Attorney, Agent, or Firm* — Adams & Wilks

(57) ABSTRACT

A method of manufacturing a rolling bearing device which can improve operational efficiency and can enhance productivity thereof is provided. The method includes the steps of: applying an adhesive agent to fitting portions formed between inner rings of two rolling bearings which are arranged coaxially in a spaced-apart manner in an axial direction and a shaft which is fitted in the inner rings and fitting portions formed between outer rings of two rolling bearings and a sleeve which is fitted on the outer rings; bringing the inner rings and the shaft into fitting engagement and the outer rings and the sleeve into fitting engagement respectively; and welding, in a state where the inner rings to which the adhesive agent is applied in the adhesive agent applying step are brought close to each other due to pushing of the inner rings in the axial direction, the pushed inner rings to the shaft by laser welding using laser power which does not generate thermal deformation of the pushed inner rings.

6 Claims, 16 Drawing Sheets

METHOD OF MANUFACTURING ROLLING BEARING DEVICE

BACKGROUND OF THE INVENTION

1. Field of the Invention

The present invention relates to a method of manufacturing a rolling bearing device.

2. Description of the Related Art

In general, a rolling bearing device is constituted of a rolling bearing which includes an inner ring and an outer ring which are arranged concentrically, an inner cylinder which is fitted in the inner ring of the rolling bearing, and an outer cylinder which is fitted on the outer ring of the rolling bearing, wherein the inner cylinder and the outer cylinder are supported by the rolling bearing in a state where the relative rotation is allowed between the inner cylinder and the outer cylinder (for example, see JP-A-11-182543 (patent document 1) and JP-A-2000-346085 (patent document 2)). In the rolling bearing device disclosed in patent document 1, a shaft (inner cylinder) and an inner ring are bonded to each other by an adhesive agent, while, a housing (outer cylinder) and an outer ring are bonded to each other by an adhesive agent. In the rolling bearing device disclosed in patent document 2, a shaft and an inner ring are bonded to each other by an anaerobic adhesive agent.

SUMMARY OF THE INVENTION

However, since an anaerobic adhesive agent requires a long hardening time and hence, bonding of a fitting portion between the shaft and the inner ring or bonding of a fitting portion between the housing and the outer ring takes time thus giving rise to a drawback that productivity of the rolling bearing device is low. Particularly, when the fitting portion is bonded in a state where a preload is applied to the rolling bearing, it is necessary to keep mounting of the rolling bearing device on a preloading jig or the like until the adhesive agent is hardened thus exhibiting poor operational efficiency.

The present invention has been made in view of such circumstances, and it is an object of the present invention to provide a method of manufacturing a rolling bearing device which can improve operational efficiency and can enhance productivity.

To achieve the above-mentioned object, the present invention provides the following means.

According to one aspect of the present invention, there is provided a method of manufacturing a rolling bearing device which includes the steps of: applying an adhesive agent to at least a portion of fitting portions formed between inner rings of two rolling bearings which are arranged coaxially in a spaced-apart manner in an axial direction and a first member which is fitted in the inner rings and a portion of fitting portions formed between outer rings of the two rolling bearings and a second member which is fitted on the outer rings; bringing the inner rings and the first member into fitting engagement and the outer rings and the second member into fitting engagement respectively; and welding, in a state where the inner rings or the outer rings to which the adhesive agent is applied in the adhesive agent applying step are brought close to each other due to pushing of the inner rings or the outer rings in the axial direction, the pushed inner rings to the first member or the pushed outer rings to the second member by laser welding using laser power which does not generate thermal deformation.

According to the present invention, the inner rings and the outer rings to which the adhesive agent is applied in the adhesive agent applying step are brought into fitting engagement with the first member and the second member in the fitting step and are welded by laser welding in the welding step in a state where the inner rings and the outer rings are pushed in the axial direction. Accordingly, even before the adhesive agent is hardened, it is possible to maintain a state where a preload is applied to the rolling bearing by a fixing strength obtained by laser welding.

In this case, by performing the laser welding using laser power which does not generate thermal deformation, it is possible to fix the fitting portions of the pushed inner rings or the pushed outer rings within an short time without causing the positional displacement or the like. Further, by merely leaving the rolling bearing device after the welding step, the adhesive agent is hardened so that the fitting portions are bonded and hence, it is possible to fix the rolling bearing in a preloaded state to the first member and the second member with sufficient bonding strength. Accordingly, operational efficiency can be enhanced irrelevant to a hardening time of an adhesive agent and hence, the rolling bearing device can be manufactured with enhanced productivity.

In the above-mentioned invention, in the adhesive agent applying step, the adhesive agent may be also applied to other fitting portions other than the fitting portions of the pushed inner rings or the pushed outer rings.

Due to such a constitution, it is possible to bond the inner rings and the first member or the outer rings and the second member at other fitting portions by an adhesive agent and hence, it is possible to manufacture the rolling bearing device where the first member or the second member and the rolling bearing are fixed to each other in a more stable manner.

Further, in the above-mentioned invention, in the welding step, laser welding may be also applied to other fitting portions besides the fitting portions of the pushed inner rings or the pushed outer rings using laser power which does not generate thermal deformation.

Due to such a constitution, it is possible to ensure the stability of the respective fitting portions in the fitting step by a fixing strength generated by laser welding.

Further, in the above-mentioned invention, in the fitting step, the inner ring of one rolling bearing may abut a radially and outwardly projecting flange portion of the first member, and two rolling bearings may be arranged in a state where a spacer portion is sandwiched between the respective outer rings in the axial direction.

Due to such a constitution, a gap which corresponds to a length of a spacer portion sandwiched between the outer rings is formed between the inner sleeves of two rolling bearings. Accordingly, it is possible to apply a preload to two rolling bearings by merely pushing the inner ring of the other rolling bearing to the inner ring of one rolling bearing which is made to abut on the flange portion of the first member in the direction that the inner ring of the other rolling bearing approaches the inner ring of one rolling bearing. Then, by applying the welding step to the fitting portion between the first member and the inner ring of the other rolling bearing in such a pushed state, it is possible to easily maintain a state where the preload is applied to the rolling bearing.

Further, according to another aspect of the present invention, there is provided a method of manufacturing a rolling bearing device which includes the steps of: applying an adhesive agent to at least a portion of fitting portions formed between inner rings of two rolling bearings which are arranged coaxially in a spaced-apart manner in an axial direction and a first member which is fitted in the inner rings; bringing the inner rings and the first member into fitting engagement; and welding, in a state where the inner rings to which the adhesive agent is applied in the adhesive agent applying step are brought close to each other due to pushing of the inner rings in the axial direction, the pushed inner rings to the first member by laser welding using laser power which does not generate thermal deformation.

According to the present invention, the inner rings to which the adhesive agent is applied in the adhesive agent applying step are brought into fitting engagement with the first member in the fitting step and are welded by laser welding in a state where the inner rings are pushed in the axial direction in the welding step. Accordingly, even before the adhesive agent is hardened, it is possible to maintain a state where a preload is applied to the rolling bearing by a fixing strength obtained by laser welding.

In this case, by performing the laser welding using laser power which does not generate thermal deformation, it is possible to fix the fitting portions of the pushed inner rings within a short time without causing the positional displacement or the like. Further, by merely leaving the rolling bearing device after the welding step, the adhesive agent is hardened so that the fitting portions are bonded and hence, it is possible to fix the rolling bearing in a preloaded state to the first member with sufficient bonding strength. Accordingly, operational efficiency can be enhanced irrelevant to a hardening time of an adhesive agent and hence, the rolling bearing device can be manufactured with enhanced productivity.

Further, according to the present invention, in the adhesive agent applying step, the adhesive agent may be applied to other fitting portions other than the fitting portions of the pushed inner rings.

Due to such a constitution, it is possible to bond the inner rings and the first member at other fitting portions by an adhesive agent and hence, it is possible to manufacture the rolling bearing device where the first member and the rolling bearing are fixed to each other in a more stable manner.

Further, according to the present invention, in the welding step, laser welding may be also applied to other fitting portions besides the fitting portions of the pushed inner rings using laser power which does not generate thermal deformation. Due to such a constitution, it is possible to ensure the stability of the respective fitting portions in the fitting step by a fixing strength generated by laser welding.

Further, according to the present invention, in the fitting step, the inner ring of one rolling bearing may be made to abut on a radially and outwardly projecting flange portion of the first member, and two rolling bearings may be arranged in a state where a spacer is sandwiched between the respective outer rings in the axial direction.

Due to such a constitution, a gap which corresponds to a length of a spacer sandwiched between the outer rings is formed between the inner rings of two rolling bearings. Accordingly, it is possible to apply a preload to two rolling bearings by merely pushing the inner ring of the other rolling bearing to the inner ring of one rolling bearing which is made to abut on the flange portion of the first member in the direction that the inner ring of the other rolling bearing approaches the inner ring of one rolling bearing. Then, by applying the welding step to the fitting portion between the first member and the inner ring of the other rolling bearing in such a pushed state, it is possible to easily maintain a state where the preload is applied to the rolling bearing.

Further, according to the present invention, a groove may be formed between an adhering portion formed by the adhesive agent and a welding portion formed by the laser welding at the same fitting portion, and an amount of the adhesive agent insufficient to fill the groove may be applied to the fitting portion in the adhesive agent applying step.

When the adhesive agent flows into the welding portion, the adhesive agent which is boiled by laser welding scatters thus giving rise to a possibility that the contamination occurs or defective bonding of a welding portion occurs. By forming the groove between the adhering portion formed by the adhesive agent and the welding portion formed by laser welding, it is possible to prevent the adhesive agent applied to the fitting portion from flowing into the welding portion from the adhering portion. Accordingly, the occurrence of the contamination and the defective connection can be prevented thus fixing the welding portion with high accuracy. In this case, for example, the adhering portion and the welding portion may be axially displaced from each other and a groove which extends in the circumferential direction may be formed between the adhering portion and the welding portion.

Further, according to the present invention, a welding mark having a diameter of 100 μm or less may be formed within a welding time of 5 msec or less in the welding step.

By performing the laser welding which forms such a welding mark, there is no possibility that the thermal deformation such as a relative change of a welding material occurs when the welding portion in a molten state is hardened and shrunken whereby the welding portion can be fixed.

Further, according to the present invention, in the welding step, the laser welding may be applied to at least three portions in a circumferentially spaced-apart manner at the same fitting portion.

Due to such a constitution, it is possible to fix the fitting portion in a circumferentially balanced manner in the welding step so that the bonding by the adhesive agent can be performed with high accuracy. Here, it is preferable to apply the laser welding at three or more portions of the fitting portion in an equally circumferentially spaced-apart manner.

The present invention has an advantageous effect that it is possible to manufacture the rolling bearing device with improved operational efficiency and enhanced productivity.

DETAILED DESCRIPTION OF THE INVENTION

First Embodiment

Hereinafter, a method of manufacturing a rolling bearing device according to a first embodiment of the present invention is explained in conjunction with drawings.

Figure 1:
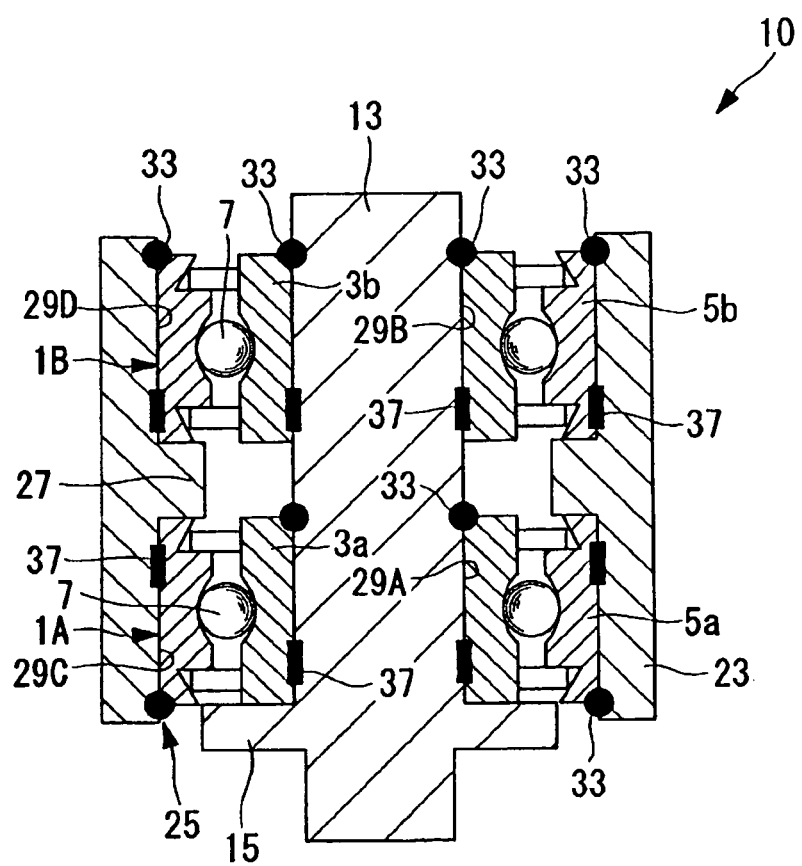
FIG. 1 is a longitudinal cross-sectional view of a rolling bearing device according to a first embodiment of the present invention.

The method of manufacturing a rolling bearing device according to this embodiment is used, for example, as shown in FIG. 1, in the manufacture of a rolling bearing device 10 which is provided for swinging a swing arm or the like used in a magnetic recording device (HDD), an optical recording device or the like. As an example, for example, the rolling bearing device 10 may be configured such that a shaft (first member) 13 and a sleeve (second member) 23 are supported by a first rolling bearing 1A and a second rolling bearing 1B (hereinafter referred to as "rolling bearings 1A, 1B") in a state where the relative rotation between the shaft 13 and the sleeve 23 is allowed. The rolling bearings 1A, 1B are respectively configured such that a plurality of rolling elements 7 are held in annular spaces defined between inner rings 3a, 3b and outer rings 5a, 5b which are arranged coaxially at predetermined intervals in the circumferential direction and in a rolling manner.

The manufacturing method of this embodiment includes: an adhesive agent applying step in which two rolling bearings 1A, 1B are arranged coaxially in a spaced-apart manner in the axial direction, and an adhesive agent is applied to the shaft 13 which is fitted in the inner rings 3a, 3b and the sleeve 23 having a fitting hole 25 in which the outer rings 5a, 5b are fitted; a fitting step in which the respective inner rings 3a, 3b and the shaft 13 are brought into fitting engagement and the respective outer rings 5a, 5b and the sleeve 23 are brought into fitting engagement; and a welding step in which respective fitting portions between the inner rings 3a, 3b and the shaft 13 are welded by laser welding and respective fitting portions between the outer rings 5a, 5b and the sleeve 23 are welded by laser welding. In FIG. 1, symbol 37 indicates an adhering portion, and symbol 33 indicates a welding portion.

In the adhesive agent applying step, an adhesive agent 35 is applied to an outer peripheral surface of the shaft 13 at a position corresponding to the inner ring 3a of the first rolling bearing 1A (see FIG. 3) and at a position corresponding to the inner ring 3b of the second rolling bearing 1B. Further, in the adhesive agent applying step, the adhesive agent 35 is applied to the fitting hole 25 of the sleeve 23 at a position corresponding to the outer ring 5a of the first rolling bearing 1A and at a position corresponding to the outer ring 5b of the second rolling bearing 1B. As the adhesive agent 35, for example, an anaerobic adhesive agent or epoxy adhesive agent can be used.

In the welding step, laser welding is applied to portions where end surfaces of the inner rings 3a, 3b and an outer peripheral surface of the shaft 13 intersect with each other (see FIG. 5), and portions where end surfaces of the outer rings 5a, 5b and an inner peripheral surface of the fitting hole 25 of the sleeve 23 intersect with each other. For example, in the same fitting portion, laser welding may be applied to at least three portions arranged in a circumferentially spaced-apart manner.

Further, in the welding step, laser welding is applied to the inner rings 3a, 3b and the outer rings 5a, 5b with laser power which does not generate thermal deformation. When laser welding is performed with such a laser power for a welding time of 5 msec or less, for example, a welding mark having a diameter of 100 μm or less is formed.

Figure 2:
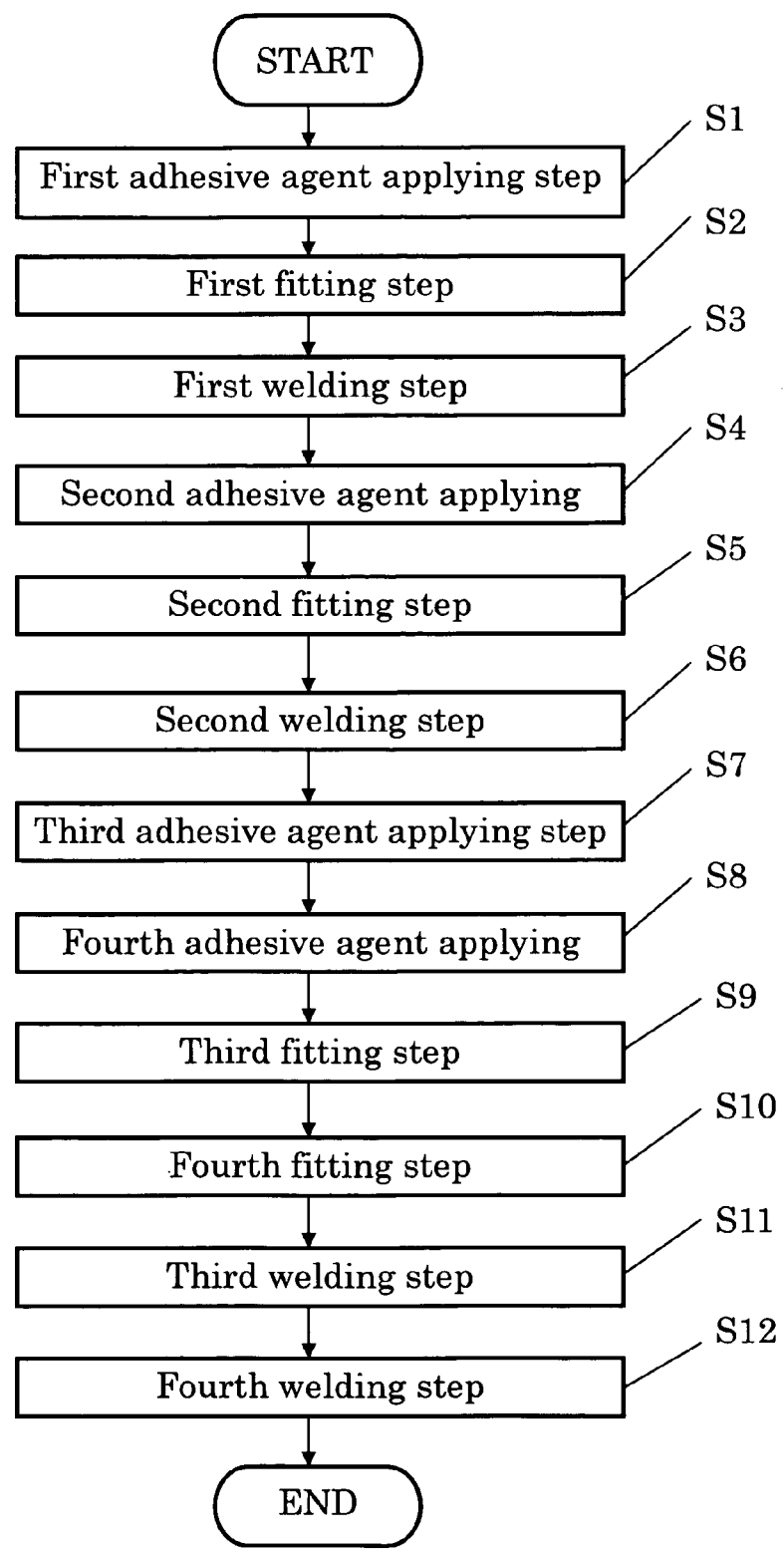
FIG. 2 is a flowchart of a method of manufacturing the rolling bearing device according to the first embodiment of the present invention.

The method of manufacturing the rolling bearing device 10 is explained in conjunction with a flowchart shown in FIG. 2.

Figure 3:
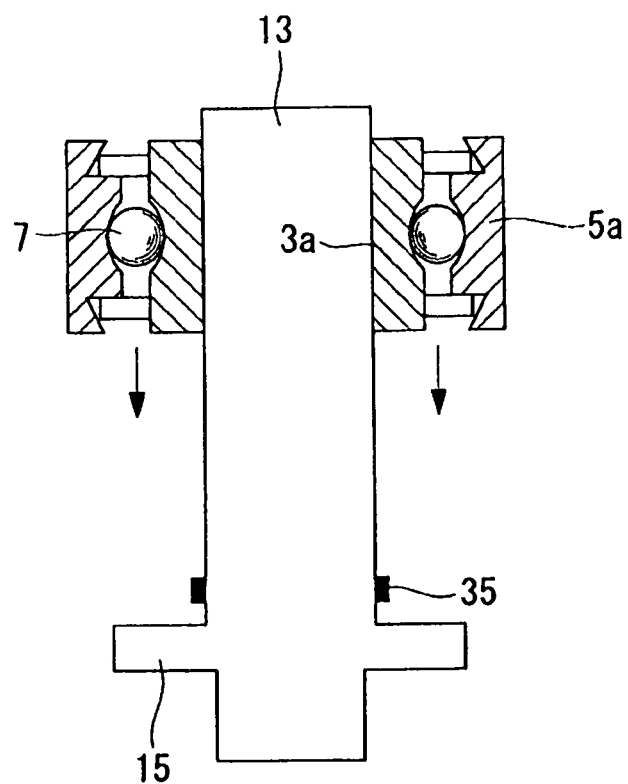
FIG. 3 is a longitudinal cross-sectional view showing a state where an adhesive agent is applied to a shaft shown in FIG. 1.
Figure 4:
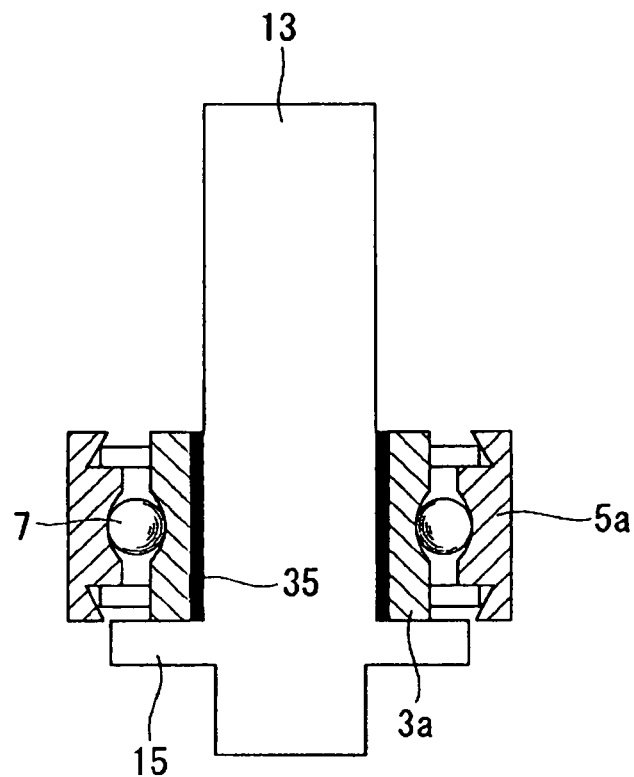
FIG. 4 is a longitudinal cross-sectional view showing a state where the shaft is fitted in an inner ring shown in FIG. 1.

Firstly, as shown in FIG. 3 and FIG. 4, the adhesive agent 35 is applied to an area of the outer peripheral surface of the shaft 13 in the vicinity of a collar-shaped flange portion 15 which is formed on one axial end of the shaft 13 and projects radially outward over the whole circumference (first adhesive agent applying step S1). Then, the shaft 13 is fitted in the inner ring 3a of the first rolling bearing shaft 1A, and an end surface of the inner ring 3a is made to abut on the flange portion 15 (first fitting step S2: the fitting portion being referred to as "fitting portion 29A" hereinafter).

Figure 5:
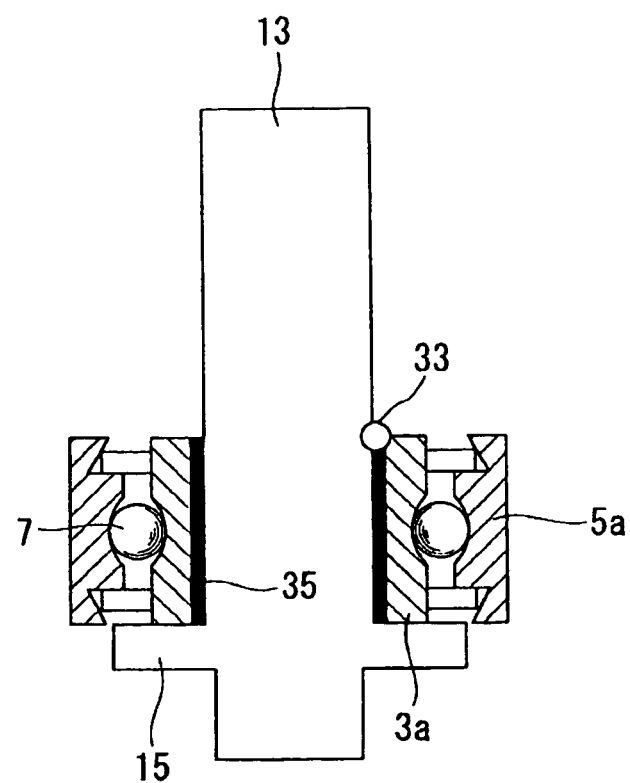
FIG. 5 is a longitudinal cross-sectional view showing a state where laser welding is applied to the inner ring and the shaft shown in FIG. 1.

Subsequently, as shown in FIG. 5, laser welding is applied to a portion of the fitting portion 29A where an end surface of the inner ring 3a on a side opposite to the end surface of the inner ring 3a which is made to abut on the flange portion 15 and an outer peripheral surface of the shaft 13 intersect with each other thus fixing the inner ring 3a and the shaft 13 (first welding step S3). In this case, by performing laser welding with laser power which does not generate the thermal deformation, it is possible to fix the shaft 13 and the inner ring 3a within a short time while maintaining a shape of the inner ring 3a and without generating positional displacement or the like. Further, it is possible to advance the processing to a next step even when the adhesive agent 35 is not still hardened.

Next, the adhesive agent 35 is applied to an area of the fitting hole 25 of the sleeve 23 in the vicinity of a projecting portion (hereinafter referred to as "spacer portion") 27 which projects radially inward over the whole circumference at an approximately axially center portion of the fitting hole 25 (second adhesive agent applying step S4). Then, the outer ring 5b of the second rolling bearing 1B is fitted in the fitting hole 25, and an end surface of the outer ring 5b is made to abut on the spacer portion 27 (second fitting step S5: the fitting portion being referred to as "fitting portion 29D" hereinafter).

Subsequently, laser welding is applied to a portion of the fitting portion 29D where an end surface of the outer ring 5b on a side opposite to the end surface of the outer ring 5b which is made to abut on the spacer portion 27 and an inner peripheral surface of the fitting hole 25 intersect with each other thus fixing the outer ring 5b and the fitting hole 25 of the sleeve 23 (second welding step S6).

Then, the adhesive agent 35 is applied to an area of an inner peripheral surface of the fitting hole 25 on a side opposite to the fitting portion 29D of the sleeve 23 in the axial direction with the spacer portion 27 sandwiched therebetween (third adhesive agent applying step S7), and the adhesive agent 35 is applied to the outer peripheral surface of the shaft 13 at a position corresponding to the second rolling bearing 1B (fourth adhesive agent applying step S8). Then, the flange portion 15 of the shaft 13 is fixed in a vertically downward posture, and the sleeve 23 is assembled to the shaft 13 from a side opposite to the fitting portion 29D in the axial direction.

To be more specific, the outer ring 5a of the first rolling bearing 1A which is bonded to the shaft 13 is fitted in the fitting hole 25 of the sleeve 23, an end surface of the outer ring 5a is made to abut on the spacer portion 27 (third fitting step S9, the fitting portion being referred to as "fitting portion 29C" hereinafter), and the shaft 13 is fitted in the inner ring 3b of the second rolling bearing 1B bonded to the sleeve 23 (fourth fitting step S10, the fitting portion being referred to as "fitting portion 29B" hereinafter) thus forming an assembled body of the rolling bearing device 10.

In such a state, laser welding is applied to a portion of the fitting portion 29C where an end surface of the outer ring 5a on a side opposite to an end surface of the outer ring 5a which is made to abut on the spacer portion 27 and an inner peripheral surface of the fitting hole 25 intersect with each other thus fixing the outer ring 5a and the fitting hole 25 of the sleeve 23 to each other (third welding step S11).

Next, the fitting portion 29B is bonded by laser welding.

Here, due to the provision of the spacer portion 27 which is sandwiched between the outer rings 5a, 5b of the rolling bearings 1A, 1B, a gap corresponding to a length of the spacer portion 27 is formed between the inner rings 3a, 3b. Accordingly, the inner ring 3a and the inner ring 3b are pushed in the direction that the inner ring 3a and the inner ring 3b approach to each other thus applying a preload to the rolling bearings 1A, 1B.

In this case, since the inner ring 3a of the first rolling bearing 1A is made to abut on the flange portion 15 of the shaft 13, by merely axially pushing the inner ring 3b of the second rolling bearing 1B arranged on a side opposite to the inner ring 3a in the axial direction, it is possible to apply a preload to both rolling bearings 1A, 1B.

In view of the above, an assembled body of the rolling bearing device 10 is mounted on a preloading jig or the like (not shown in the drawing) thus pushing the inner ring 3b of the second rolling bearing 1B in the axial direction. In such a state, laser welding is applied to a portion where an end surface of the inner ring 3b and an outer peripheral surface of the shaft 13 intersect with each other thus fixing the inner ring 3b and the shaft 13 to each other (fourth welding step S12).

By applying laser welding to the shaft 13 in a state where the inner ring 3b is pushed, even before an adhesive agent applied to the fitting portion 29B is hardened, it is possible to maintain a state where a preload is applied to two rolling bearings 1A, 1B by a fixing strength generated by laser welding. Accordingly, by merely taking out the assembled body of the rolling bearing device 10 from the preloading jig and by leaving the assembled body, it is possible to fix the fitting portion 29B due to hardening of the adhesive agent 35 with a sufficient bonding strength. Further, due to hardening of the adhesive agent 35, also at other fitting portion 29A, 29C and 29D, the shaft 13, the sleeve 23 and the rolling bearings 1A, 1B can be fixed to each other in a more stable manner.

In this manner, by merely leaving the assembled body of the rolling bearing device 10 after the fourth welding step S12, it is possible to complete the rolling bearing device 10 where the respective fitting portions 29A, 29B, 29C and 29D are fixed with a sufficient bonding strength.

As has been explained heretofore, according to the method of manufacturing the rolling bearing device 10 of this embodiment, the processing can advance to a next operational step before the adhesive agent 35 is hardened due to a fixing strength of the fitting portion 29B or the like in the welding step. Accordingly, it is possible to improve an operational efficiency irrelevant to a hardening time of the adhesive agent thus realizing the manufacture of the rolling bearing device 10 with enhanced productivity. Further, by applying laser welding to all fitting portions 29A, 29B, 29C and 29D, it is possible to ensure the stability of the respective fitting portions 29A, 29B, 29C and 29D during the manufacture by a fixing strength generated by laser welding.

Although the welding step is applied to all fitting portions 29A, 29B, 29C and 29D in this embodiment, it is sufficient to apply the welding step to at least the fitting portions which are pushed for applying a preload to the rolling bearings 1A, 1B. For example, the adhesive agent applying step and the welding step are applied to only the fitting portion 29B between the inner ring 3b to be pushed and the shaft 13, and only the adhesive agent applying step may be applied to other fitting portions 29A, 29C and 29D.

Second Embodiment

Hereinafter, a method of manufacturing a rolling bearing device according to a second embodiment of the present invention is explained.

Figure 6:
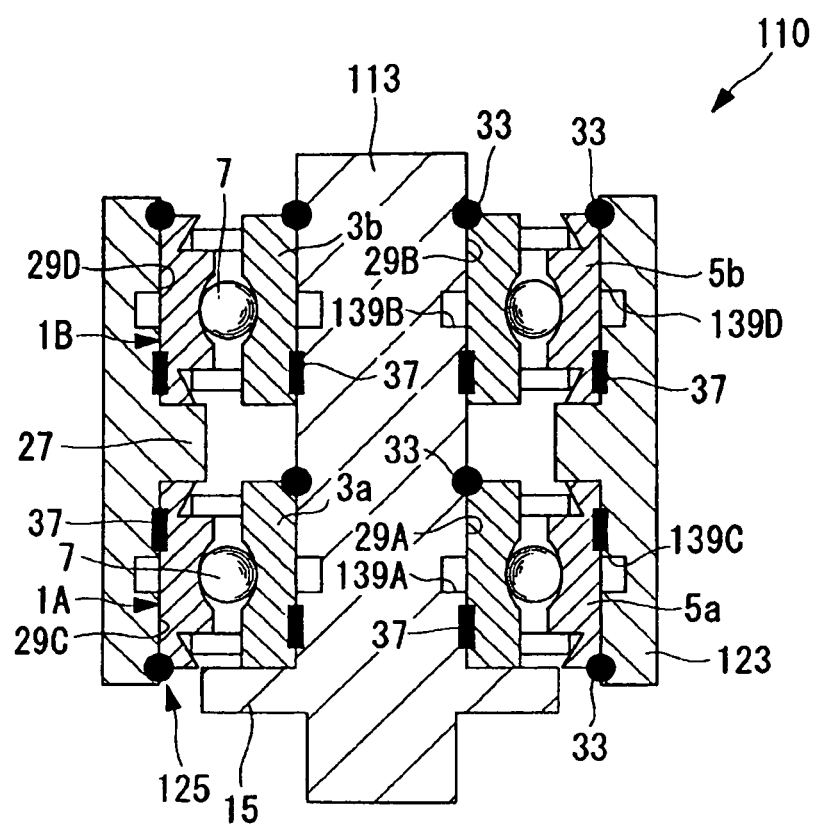
FIG. 6 is a longitudinal cross-sectional view of a rolling bearing device according to a second embodiment of the present invention.

The method of manufacturing a rolling bearing device 110 according to this embodiment differs from the method of manufacturing the rolling bearing device 10 of the first embodiment with respect to following points. As shown in FIG. 6, a first member is constituted of a shaft 113 on which a groove 139A and a groove 139B are formed, wherein these grooves 139A, 139B are indented radially inward over the whole circumference at the approximately center of fitting portions 29A, 29B in the axial direction. A second member is constituted of a sleeve 123 having a fitting hole 125 on which a groove 139C and a groove 139D are formed, wherein these grooves 139C, 139D are indented radially outward over the whole circumference at the approximately center of the fitting portions 29C, 29D in the axial direction. Further, in an adhesive agent applying step, an amount of an adhesive agent 35 which is insufficient to fill the grooves 139A, 139B, 139C and 139D is applied.

In the explanation of this embodiment made hereinafter, parts which have the same constitution as parts used in the method of manufacturing the rolling bearing device 10 according to the first embodiment are given same symbols, and their explanation is omitted.

In a first adhesive agent applying step S1, an adhesive agent 35 is applied to a portion of an outer peripheral surface of the shaft 113 between the groove 139A and a flange portion 15 preferably in the vicinity of the flange portion 15. In a second adhesive agent applying step S4, the adhesive agent 35 is applied to a portion of a fitting hole 125 of the sleeve 123 between the groove 139D and a spacer portion 27 preferably in the vicinity of the spacer portion 27. Further, in a third adhesive agent applying step S7, the adhesive agent 35 is applied to a portion of the fitting hole 125 of the sleeve 123 between the groove 139C and the spacer portion 27, preferably in the vicinity of the spacer portion 27. Further, in a fourth adhesive agent applying step S8, the adhesive agent 35 is applied to a portion between an end surface of an inner ring 3b on a side opposite to an end surface of the inner ring 3b to which the laser welding is applied by the fourth welding step S12 and the groove 139B.

When the applied adhesive agent 35 flows into a welded portion 33, there arises a possibility that the adhesive agent 35 boiled by laser welding scatters thus causing contamination or defective bonding of the welding portion 33. According to this embodiment, by arranging the groove 139A between an adhering portion 37 to which the adhesive agent 35 is applied and the welding portion 33, it is possible to prevent the adhesive agent 35 from flowing into the welding portion 33.

Figure 7:
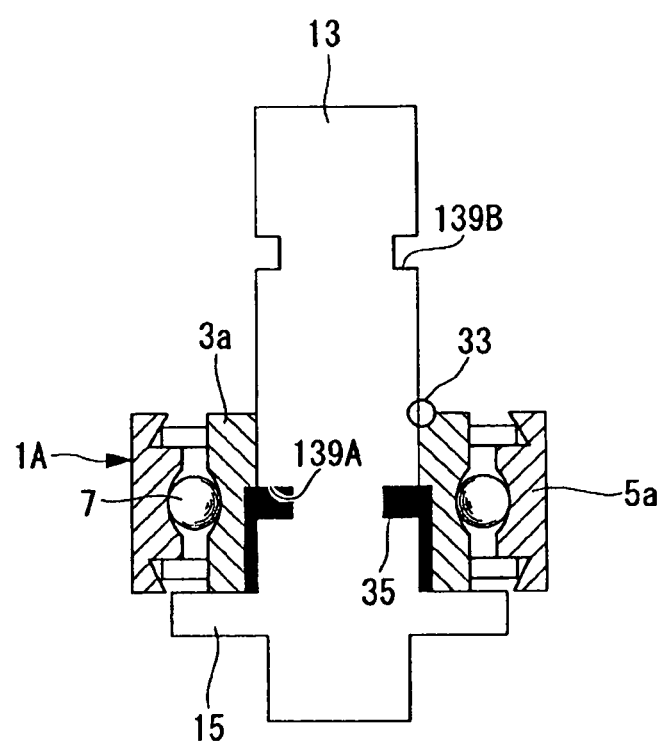
FIG. 7 is a longitudinal cross-sectional view showing a state where a shaft and an inner ring shown in FIG. 6 are brought into fitting engagement.

For example, in a first fitting step S2, as shown in FIG. 7, even when the adhesive agent 35 is prone to spread in the axial direction, it is possible to limit a range within which the adhesive agent 35 spreads by making the adhesive agent 35 flow into the groove 139A. Further, by applying an amount of adhesive agent 35 insufficient to fill the groove 139A, it is possible to prevent the adhesive agent 35 from overflowing from the groove 139A thus surely preventing the adhesive agent 35 from flowing into the welding portion 33. The same goes for other fitting portions 29A, 29C, and 29D. Since the flow of each step is substantially equal to the corresponding step of the first embodiment, the explanation is omitted.

As has been explained heretofore, according to the method of manufacturing the rolling bearing device 110 of this embodiment, it is possible to prevent the adhesive agent 35 from flowing into the welding portion 33 due to the formation of the grooves 139A, 139B, 139C and 139D thus preventing the occurrence of contamination and defective bonding leading to the fixing of the welding portion 33 with high accuracy.

Figure 8:
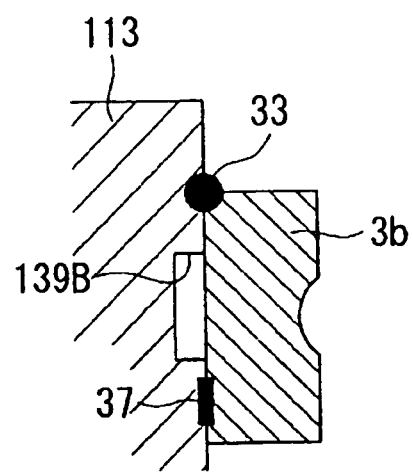
FIG. 8 is a longitudinal cross-sectional view showing one example of a shape of a groove formed on the shaft according to a second embodiment of the present invention.
Figure 9:
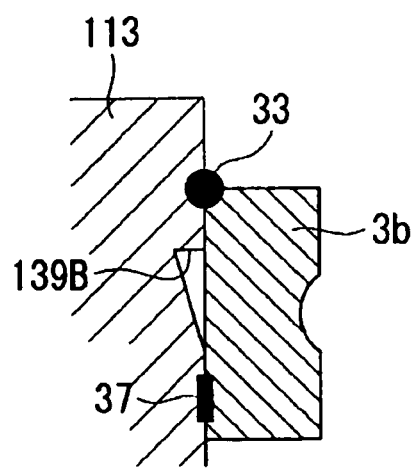
FIG. 9 is a longitudinal cross-sectional view showing another example of the shape of the groove formed on the shaft according to the second embodiment of the present invention.
Figure 10:
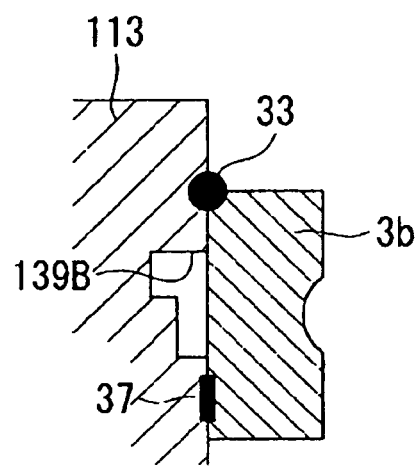
FIG. 10 is a longitudinal cross-sectional view showing still another example of the shape of the groove formed on the shaft according to the second embodiment of the present invention.
Figure 11:
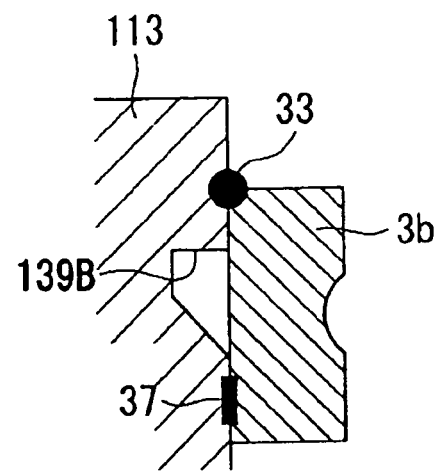
FIG. 11 is a longitudinal cross-sectional view showing still another example of the shape of the groove formed on the shaft according to the second embodiment of the present invention.
Figure 12:
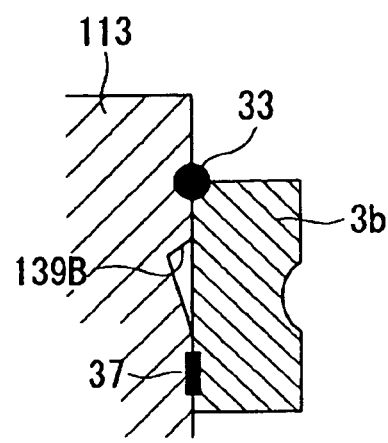
FIG. 12 is a longitudinal cross-sectional view showing still another example of the shape of the groove formed on the shaft according to the second embodiment of the present invention.

To explain a shape of the grooves 139A, 139B, 139C and 139D, for example, as exemplified with respect to the fitting portion 29B shown in FIG. 8, the groove 139B may have a fixed depth in the widthwise direction or the groove 139B may have a different depth in the widthwise direction. When the groove 139B has the different depth in the widthwise direction, it is desirable that a depth of the groove 139B on a welding portion 33 side is larger than a depth of the groove 139B on an adhering portion 37 side. For example, as shown in FIG. 9, the groove 139B may be indented substantially perpendicular to an outer peripheral surface of the shaft 13 on the welding portion 33 side, and a depth of the groove 139B may be gradually decreased toward an adhesive portion 37 side. Further, as shown in FIG. 10, the groove 139B may have a stepped shape where a deep groove is formed on the welding portion 33 side and a shallow groove is formed on the adhering portion 37 side. Still further, as shown in FIG. 11, the groove 139B may have a shape where a depth of the groove 139B is gradually decreased toward the adhering portion 37 side from a deep groove having a fixed width on the welding portion 33 side. Still further, as shown in FIG. 12, the groove 139B is indented at a gentle angle on the adhering portion 37 side, and the groove 139B is indented at an angle which is larger than such a gentle angle on the welding portion 33 side. As shown in FIGS. 9 to 12, by making the depth on the welding portion 33 side larger than the depth on the adhering portion 37 side, in a path leading to the groove 139B from the adhering portion 37, it is possible to prevent the flowout of the adhesive agent into the welding portion due to a surface tension of the adhesive agent.

Figure 13:
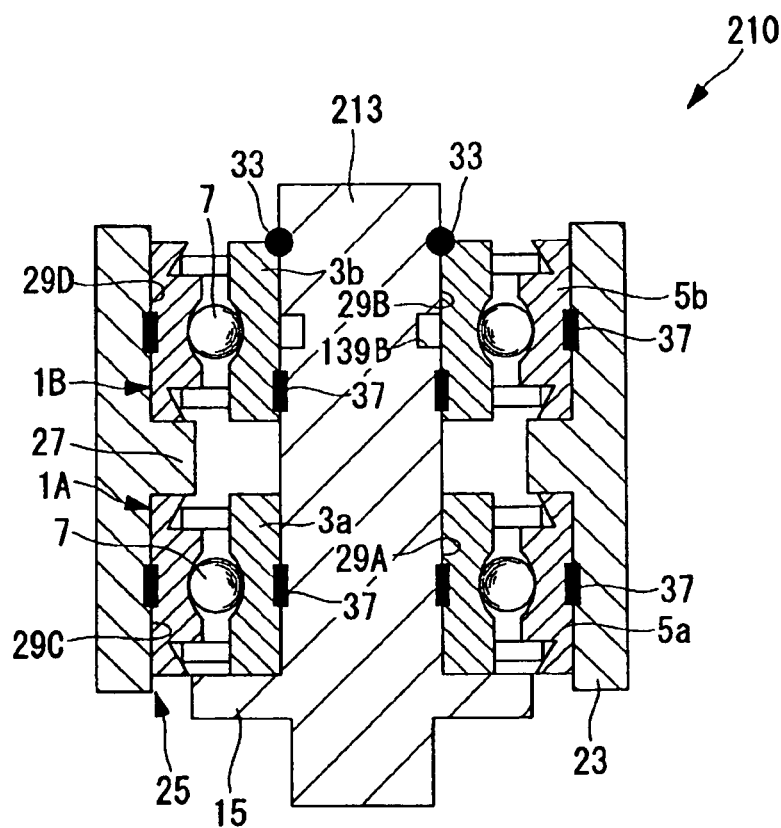
FIG. 13 is a longitudinal cross-sectional view showing a rolling bearing device according to a modification of the second embodiment of the present invention.

Also in this embodiment, it is sufficient to apply a welding step to only the fitting portion which is pushed for applying a preload to at least the rolling bearings 1A, 1B. For example, as in the case of a rolling bearing device 210 shown in FIG. 13, a shaft 213 on which a groove 139B is formed in the fitting portion 29B at the approximately center of the shaft 13 in the axial direction is adopted, and a welding step is applied to only the fitting portion 29B.

Third Embodiment

A method of manufacturing a rolling bearing device according to a third embodiment of the present invention is explained.

Figure 14:
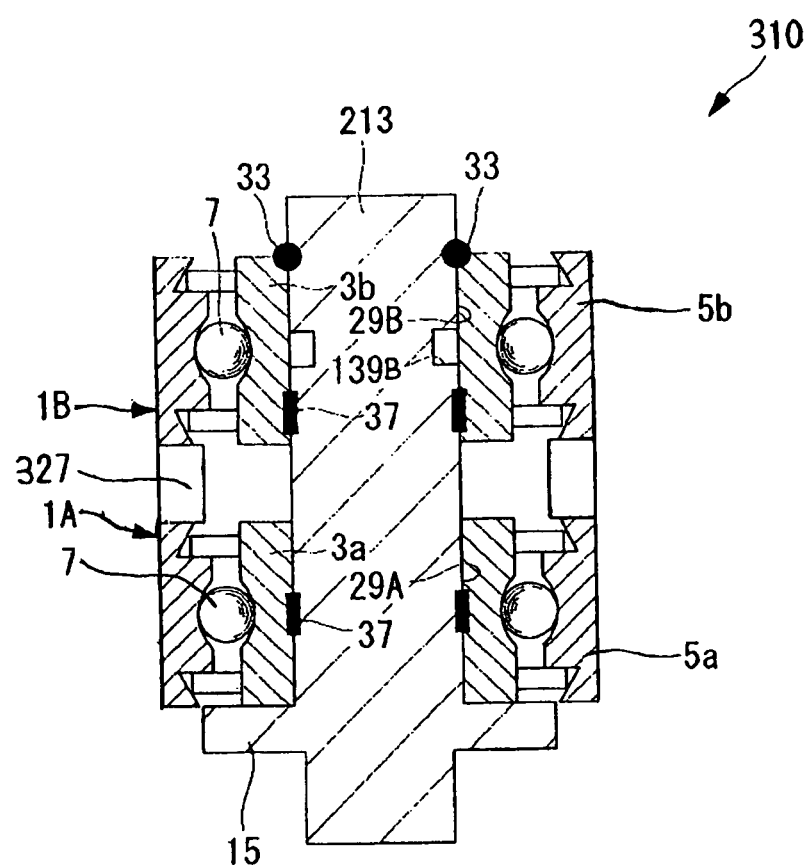
FIG. 14 is a longitudinal cross-sectional view of a rolling bearing device according to a third embodiment of the present invention.

In the method of manufacturing a rolling bearing device 310 according to this embodiment, as shown in FIG. 14, a spacer 327 is inserted between an outer ring 5a of a rolling bearing 1A and an outer ring 5b of a rolling bearing 1B. This embodiment differs from the first embodiment and the second embodiment with respect to a point that a gap is formed between inner rings 3a, 3b by the spacer 327 instead of the spacer portion 27 formed on the sleeve 23 for forming the gap between the inner rings 3a, 3b and the spacer portion 27 formed on the sleeve 123.

In the explanation of this embodiment made hereinafter, parts which have the same constitution as parts used in the method of manufacturing the rolling bearing device 10 according to the first embodiment and the rolling bearing device 210 according to the second embodiment are given same symbols, and their explanation is omitted.

Figure 15:
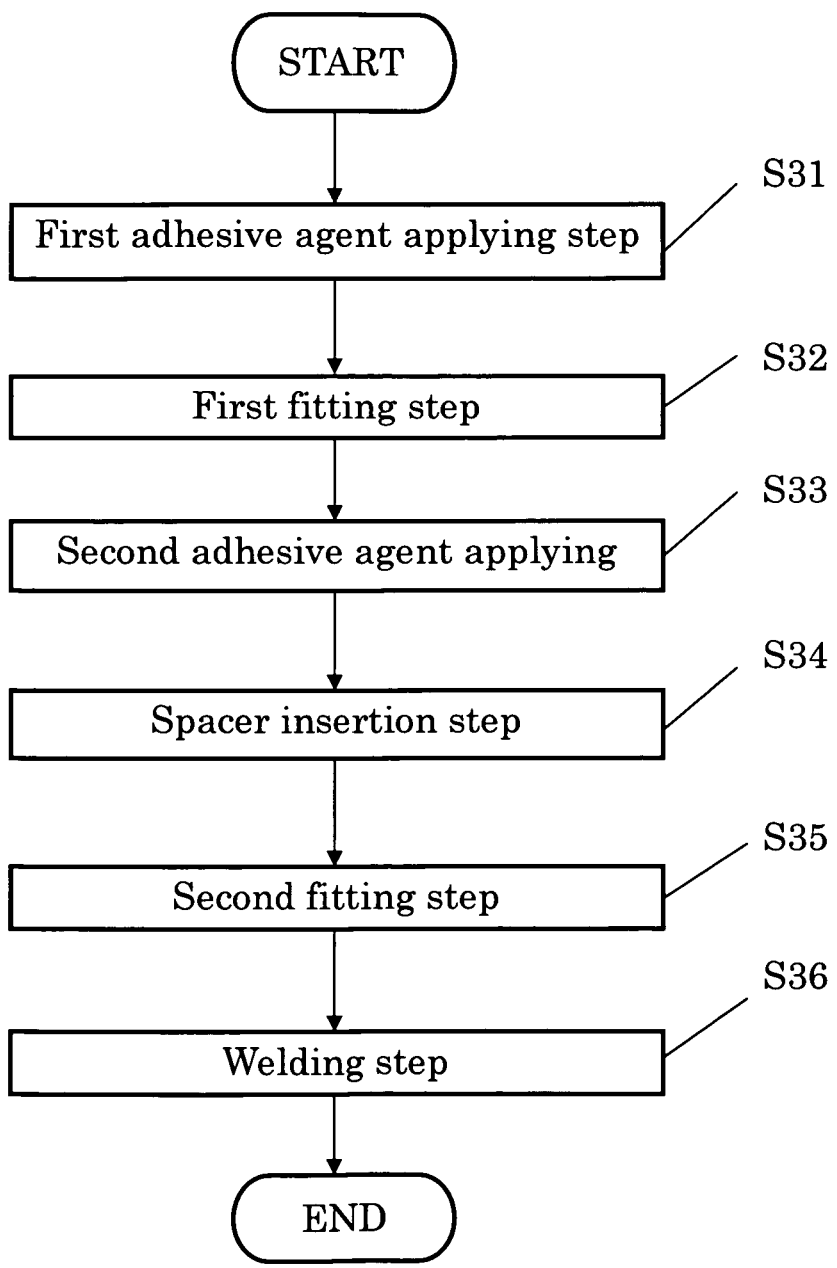
FIG. 15 is a flowchart of a method of manufacturing the rolling bearing device according to the third embodiment of the present invention.

Hereinafter, manufacturing method of the rolling bearing device 310 is explained in conjunction with a flowchart shown in FIG. 15.

Figure 16:
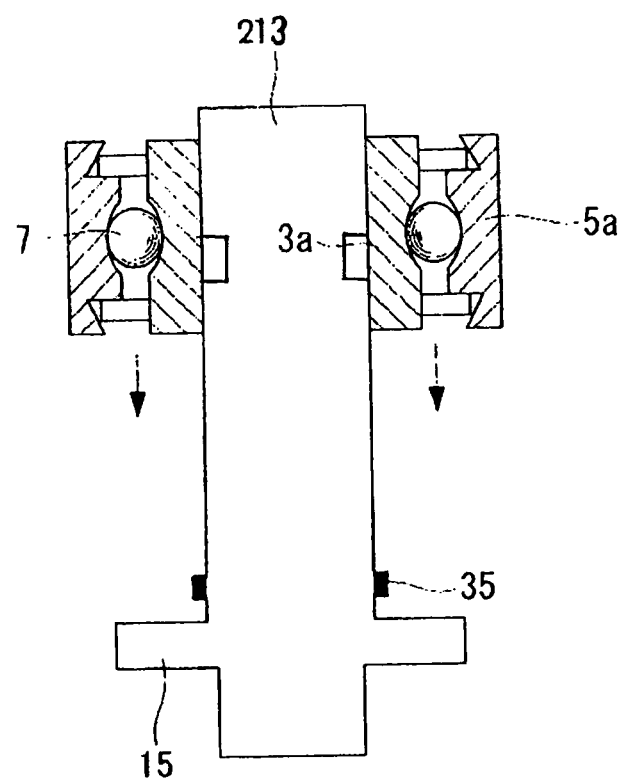
FIG. 16 is a longitudinal cross-sectional view showing a state where an adhesive agent is applied to a shaft shown in FIG. 14.
Figure 17:
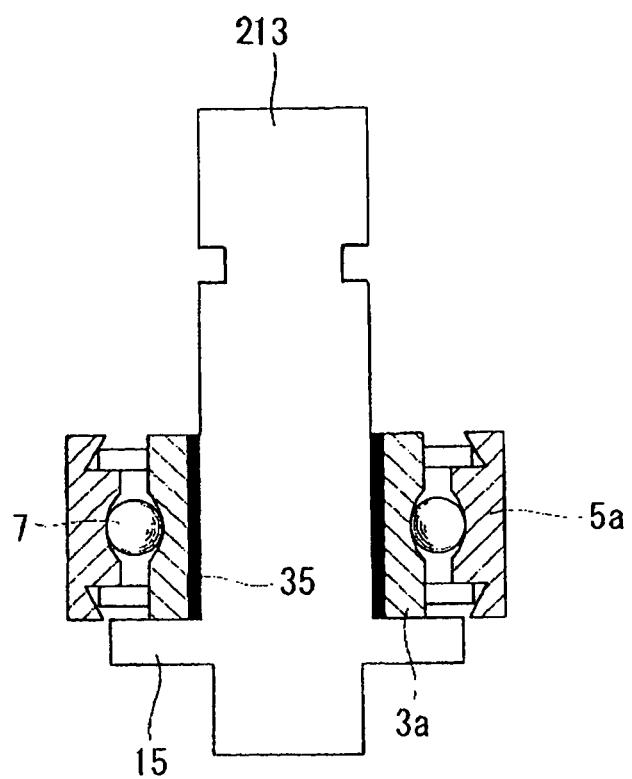
FIG. 17 is a longitudinal cross-sectional view showing a state where the shaft is fitted in an inner ring shown in FIG. 14.

Firstly, as shown in FIG. 16 and FIG. 17, the adhesive agent 35 is applied to an area of the outer peripheral surface of the shaft 213 in the vicinity of a collar-shaped flange portion 15 which is formed on one axial end of the shaft 213 and projects radially outward over the whole circumference (first adhesive agent applying step S31). Then, the shaft 213 is fitted in the inner ring 3a of the first rolling bearing 1A, and an end surface of the inner ring 3a is made to abut on the flange portion 15 (first fitting step S32).

Subsequently, the adhesive agent 35 is applied to a portion between an end surface of the inner ring 3b on a side opposite to an end surface of the inner ring 3b to which laser welding is applied and a groove 139B, on a shaft 213 side (second adhesive agent applying step S33).

Next, a spacer 327 is mounted on an outer ring 5a of the first rolling bearing 1A (spacer insertion step S34).

Then, an inner ring 3b of a second rolling bearing 1B is fitted on the shaft 213 to which the flange portion 15 is fixed vertical downward, and the outer ring 5b is made to abut on the spacer 327 (second fitting step S35).

Then, the fitting portion 29B is bonded by laser welding.

Here, due to the provision of the spacer 327 which is sandwiched between the outer rings 5a, 5b of the rolling bearings 1A, 1B, a gap corresponding to a length of the spacer 327 is formed between the inner rings 3a, 3b. Accordingly, the inner ring 3a and the inner ring 3b are pushed in the direction that the inner ring 3a and the inner ring 3b approach to each other thus applying a preload to the rolling bearings 1A, 1B.

In this case, since the inner ring 3a of the first rolling bearing 1A is made to abut on the flange portion 15 of the shaft 213, by merely axially pushing the inner ring 3b of the second rolling bearing 1B arranged on a side opposite to the inner ring 3a in the axial direction, it is possible to apply a preload to both rolling bearings 1A, 1B.

In view of the above, an assembled body of the rolling bearing device 10 is mounted on a preloading jig or the like (not shown in the drawing) thus pushing the inner ring 3b of the second rolling bearing 1B in the axial direction. In such a state, laser welding is applied to a portion where an end surface of the inner ring 3b and an outer peripheral surface of the shaft 213 intersect with each other thus fixing the inner ring 3b and the shaft 213 to each other (welding step S36).

By applying laser welding to the shaft 213 in a state where the inner ring 3b is pushed, even before an adhesive agent applied to the fitting portion 29B is hardened, it is possible to maintain a state where a preload is applied to two rolling bearings 1A, 1B by a fixing strength generated by laser welding. Accordingly, by merely taking out the assembled body of the rolling bearing device 310 from the preloading jig and by leaving the assembled body, it is possible to fix the fitting portion 29B with a sufficient bonding strength due to hardening of the adhesive agent 35. Further, due to hardening of the adhesive agent 35 also at the fitting portion 29A, the shaft 213 and the rolling bearings 1A, 1B can be fixed to each other in a more stable manner. Further, since a preload is applied to the first rolling bearing 1A and the second rolling bearing 1B, the spacer 327 sandwiched between the outer ring 5a and the outer ring 5b is held by a frictional force.

In this manner, by merely leaving the assembled body of the rolling bearing device 310 after the welding step S36, it is possible to complete the rolling bearing device 10 where the respective fitting portions 29A, 29B are fixed with a sufficient bonding strength.

Further, in this embodiment, with respect to the first rolling bearing 1A and the shaft 213, the shaft 213 may be welded to the end surface of the inner ring 3a on a side opposite to the flange 15 in the axial direction of the shaft 213 after the first fitting step (S32). In this case, the shaft 213 and the first rolling bearing 1A are fixed to each other by welding even before the adhesive agent is hardened and hence, it is possible to carry or temporarily store an assembled body without waiting for the hardening of the adhesive agent 35.

Although the embodiments of the present invention have been explained in detail in conjunction with drawings, the specific constitution of the present invention is not limited to these embodiments, and various modifications and variations can be made without departing from the gist of the present invention.

Figure 18:
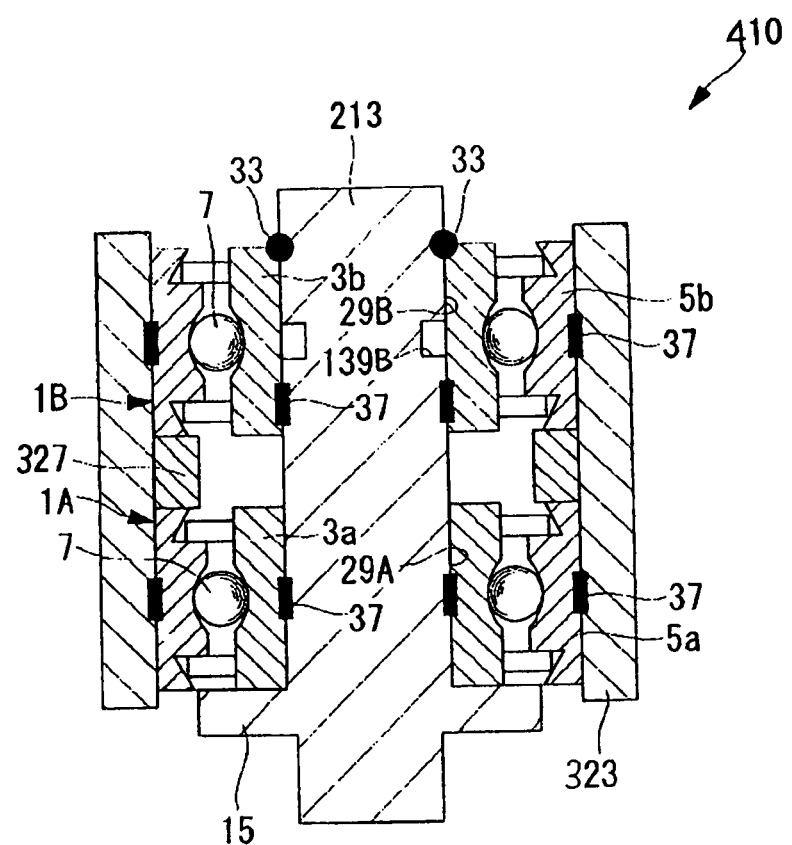
FIG. 18 is a longitudinal cross-sectional view of a rolling bearing device according to a modification of the third embodiment of the present invention.

For example, in the above-mentioned respective embodiments, as the second member, the sleeve 23, 123 which is provided with the spacer portion 27 on the inner surface of the fitting hole 25, 125 has been exemplified. However, in place of these sleeves 23, 123, for example, as shown in FIG. 18, a sleeve which is not provided with such a spacer portion 27 may be adopted. In this case, after the welding step S36 in the embodiment 3 is finished, a rolling bearing 310 is inserted into a sleeve 323 which is not provided with a spacer portion sandwiched between rolling bearings 1A, 1B, and the rolling bearing 310 may be fixed by adhesion or welding thus constituting a rolling bearing device 410.

Further, in the above-mentioned respective embodiments, the adhesive agent 35 is applied to the outer peripheral surface of the shaft 13 and the fitting holes 25, 125 of the sleeves 23, 123. However, in place of such constitution, the adhesive agent 35 may be applied to the inner peripheral surfaces of the inner rings 3a, 3b and outer peripheral surfaces of the outer rings 5a, 5b of the rolling bearing 1A, 1B.

What is claimed is:

1. A method of manufacturing a rolling bearing device, the method comprising the steps of:
applying an adhesive agent to at least a portion of fitting portions formed between inner rings of two rolling bearings which are arranged coaxially in a spaced-apart manner in an axial direction and a first member which is fitted in the inner rings;
bringing the inner rings and the first member into fitting engagement; and
pushing the inner rings to which the adhesive agent is applied towards each other in the axial direction and welding the pushed inner rings to the first member by laser welding using laser power which does not generate thermal deformation,
wherein a groove is formed between an adhering portion formed by the adhesive agent and a welding portion formed by the laser welding at the same fitting portion, and
an amount of the adhesive agent insufficient to fill the groove is applied to the fitting portion in the adhesive agent applying step.

2. A method of manufacturing a rolling bearing device, the method comprising the steps of:
applying an adhesive agent to at least a portion of fitting portions formed between inner rings of two rolling bearings which are arranged coaxially in a spaced-apart manner in an axial direction and a first member which is fitted in the inner rings;
bringing the inner rings and the first member into fitting engagement; and
pushing the inner rings to which the adhesive agent is applied towards each other in the axial direction and welding the pushed inner rings to the first member by laser welding using laser power which does not generate thermal deformation,
wherein a welding mark having a diameter of 100 µm or less is formed within a welding time of 5 msec or less in the welding step.

3. A method of manufacturing a rolling bearing device, the method comprising the steps of:
applying an adhesive agent to at least a portion of fitting portions formed between inner rings of two rolling bearings which are arranged coaxially in a spaced-apart manner in an axial direction and a first member which is fitted in the inner rings;
bringing the inner rings and the first member into fitting engagement; and
pushing the inner rings to which the adhesive agent is applied towards each other in the axial direction and welding the pushed inner rings to the first member by laser welding using laser power which does not generate thermal deformation,
wherein in the welding step, the laser welding is applied to at least three portions in a circumferentially spaced-apart manner at the same fitting portion.

4. A method of manufacturing a rolling bearing device, the method comprising the steps of:
applying an adhesive agent to at least (1) a portion of fitting portions formed between inner rings of two rolling bearings which are arranged coaxially in a spaced-apart manner in an axial direction and a first member which is fitted in the inner rings and (2) a portion of fitting portions formed between outer rings of the two rolling bearings and a second member which is fitted on the outer rings;
bringing the inner rings and the first member into fitting engagement and bringing the outer rings and the second member into fitting engagement; and
pushing the inner rings or the outer rings to which the adhesive agent is applied towards each other in the axial direction and welding the pushed inner rings to the first member or the pushed outer rings to the second member by laser welding using laser power which does not generate thermal deformation, wherein a groove is formed between an adhering portion formed by the adhesive agent and a welding portion formed by the laser welding at the same fitting portion, and an amount of the adhesive agent insufficient to fill the groove is applied to the fitting portion in the adhesive agent applying step.

5. A method of manufacturing a rolling bearing device, the method comprising the steps of:

applying an adhesive agent to at least (1) a portion of fitting portions formed between inner rings of two rolling bearings which are arranged coaxially in a spaced-apart manner in an axial direction and a first member which is fitted in the inner rings and (2) a portion of fitting portions formed between outer rings of the two rolling bearings and a second member which is fitted on the outer rings;

bringing the inner rings and the first member into fitting engagement and bringing the outer rings and the second member into fitting engagement; and pushing the inner rings or the outer rings to which the adhesive agent is applied towards each other in the axial direction and welding the pushed inner rings to the first member or the pushed outer rings to the second member by laser welding using laser power which does not generate thermal deformation, wherein a welding mark having a diameter of 100 µm or less is formed within a welding time of 5 msec or less in the welding step.

6. A method of manufacturing a rolling bearing device, the method comprising the steps of:

applying an adhesive agent to at least (1) a portion of fitting portions formed between inner rings of two rolling bearings which are arranged coaxially in a spaced-apart manner in an axial direction and a first member which is fitted in the inner rings and (2) a portion of fitting portions formed between outer rings of the two rolling bearings and a second member which is fitted on the outer rings;

bringing the inner rings and the first member into fitting engagement and bringing the outer rings and the second member into fitting engagement; and pushing the inner rings or the outer rings to which the adhesive agent is applied towards each other in the axial direction and welding the pushed inner rings to the first member or the pushed outer rings to the second member by laser welding using laser power which does not generate thermal deformation, wherein in the welding step, the laser welding is applied to at least three portions in a circumferentially spaced-apart manner at the same fitting portion.

* * * * *